Patented Oct. 18, 1932

1,882,978

UNITED STATES PATENT OFFICE

OTTO SCHMIDT AND OTTO GROSSKINSKY, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

RECOVERY OF UNSATURATED ALIPHATIC HYDROCARBONS

No Drawing. Application filed March 15, 1928, Serial No. 262,035, and in Germany March 21, 1927.

This invention relates to the recovery of unsaturated aliphatic hydrocarbons.

In the various processes of cracking oils, tars and the like and in many other processes such as in the production of unsaturated hydrocarbons, mixtures of unsaturated hydrocarbons with saturated hydrocarbons, hydrogen and other compounds are obtained, which can be separated only with difficulties. For example butadiene and butylene which are formed very often when cracking hydrocarbons, are very difficult to separate as their boiling points are within a very narrow range. Also the separation of acetylene from a mixture thereof with methane or ethane is a very cumbrous operation, the boiling points of these bodies being just in the neighborhood of each other and a compression of a mixture of gases containing acetylene being a risky operation on account of the danger of explosion.

We have found that the unsaturated aliphatic hydrocarbons are easily separated by treating mixtures containing the same with organic solvents or mixtures thereof at atmospheric or higher pressure. Suitable solvents for the process according to the present invention are liquid organic compounds containing at least one element selected from the group consisting of oxygen, nitrogen and halogen. The unsaturated hydrocarbons are absorbed by the solvents and can easily be recovered therefrom by heating. In many cases those organic compounds which possess a high dielectric constant and comprise one or more oxygen atoms in the molecule are most suitable as solvents. The organic compounds employed as solvents may contain, for example, hydroxyl or acyl or aldehyde or alkoxyl or halogen groups or several of these radicles, as, for example, ethylene chlorydrin, glycol mono-acetate or di-acetate, glycol monomethyl ether, glycerin di- or tri-acetate, lactic acid nitril, di-ethyl-tartrate, furfurol and the like. Also aromatic bases such as aniline, toluidine or phenyl hydrazine can be employed. Only very few organic solvents are not very suitable for the said purpose, as for example glycerine and glycol. The possibility of employing the said different compounds for the process according to the present invention probably depends on the dielectric value of the single bodies of each group though we do not bind ourselves to this explanation. Thus, for example, furfurol (with a dielectric constant of 41.7) is very much more effective than benzaldehyde which, probably on account of its low dielectric constant of 18, is practically of no value at all, and aniline and phenyl hydrazine with dielectric constants of 7.3 and 7.15 respectively, are more advantageous than is toluidine, with a dielectric constant of 6. During the treatment of the initial material with the organic solvents, the hydrocarbon containing more unsaturated linkages is completely or almost completely absorbed by the solvent, probably because the affinity of the solvents is greater to the more unsaturated hydrocarbons than to the less unsaturated or saturated hydrocarbons or other substances. The said solvents employed according to the process of the present invention when shaken up with a liquid mixture of mono-olefines and diolefines cause the formation of two separate layers at atmospheric or higher pressure.

The solvents can be employed as such or in mixture with each other, and the treatment can be performed at athospheric or higher pressure depending on the nature of the initial materials and on the temperature of working, which possibilities allow of working also with an initial material in the gaseous state. If a liquid material be acted upon at too high a temperature it may happen that the two layers formed will not easily separate, which difficulty can be avoided by working at lower temperatures or by cooling. The temperatures employed must therefore be regulated in accordance with the kind of the initial material to be acted upon and, likewise, with the solvent or mixture of solvents employed.

When acting upon an initial material in the gaseous state the process is preferably carried out by conducting the gaseous material, in a scrubbing tower in counter-current against the liquid solvent, so that the gases freed from unsaturated compounds are drawn off at the top, whilst the solution containing these compounds accumulates at the bottom.

In the manner described above di-olefines can be separated from mono-olefines, saturated hydrocarbons, hydrogen and other gases, or acetylene can be recovered from mixtures thereof with hydrogen, methane and other saturated paraffin hydrocarbons. Mixtures which may be treated according to the process of the present invention are, for example, mixtures of isoprene and pentane, or of acetylene, methane and ethane, which can be separated into their single constituents. Mixtures of compounds which are liquid at about room temperature or of easily condensible gases are separated into two layers on treating them with the said solvents, from which separated layers the single constituents can be easily recovered by any known method, for example, isoprene and pentane can be separated by mixing them with ethylene chlorhydrine, the pentane being substantially contained in the upper layer.

The nature of this invention will be further illustrated by the following examples, but the invention is not limited thereto.

*Example 1*

A mixture of 65 per cent by volume of butadiene and 35 per cent of butylene is passed at 0° C. through furfurol, whereby practically all the butadiene and merely traces of butylene are absorbed. By slowly heating the liquid the absorbed compounds are expelled and after condensation a liquid containing from 80 to 85 per cent of butadiene is obtained, which content may be further raised by repeating the operation. Thus, from the mixture of gases almost pure butadiene and butylene can be produced.

*Example 2*

A scrubbing tower filled with rings or similar material having a high superficial area is fed from above with ethylene chlorhydrin at about from 5° to 10° C. and a gaseous mixture of butylene and butadiene is introduced at the bottom, the gases then passing through the tower in counter-current to the solvent. The speed of introducing the gases is regulated in accordance with the height of the tower and the speed of feeding the solvent, so that the gases escaping at the top consist of practically pure butylene, whilst the butadiene is absorbed in the solvent accumulating at the bottom.

What we claim is:—

1. The process of recovering and separating butadiene which comprises treating a mixture containing the same with an organic solvent containing at least one element selected from the group consisting of oxygen, nitrogen and halogen and which when shaken with a liquid mixture of diolefines and mono-olefines causes the formation of two separate layers.

2. The process of recovering and separating butadiene which comprises treating a gaseous mixture containing the same with an organic solvent containing at least one element selected from the group consisting of oxygen, nitrogen and halogen and which when shaken with a liquid mixture of diolefines and mono-olefines causes the formation of two separate layers.

3. The process of recovering and separating butadiene which comprises treating a mixture containing the same in countercurrent with an organic solvent containing at least one element selected from the group consisting of oxygen, nitrogen and halogen, and which when shaken with a liquid mixture of diolefines and mono-olefines causes the formation of two separate layers, and expelling the absorbed unsaturated hydrocarbons from the solvent.

4. The process of recovering and separating butadiene which comprises treating a mixture containing the same and liquid, more saturated hydrocarbons with an organic solvent containing at least one element selected from the group consisting of oxygen, nitrogen and halogen and which when shaken with a liquid mixture of diolefines and mono-olefines causes the formation of two separate layers, separating the different layers and expelling the absorbed unsaturated hydrocarbons from the solvent.

5. The process for the separation of a mixture of butadiene and butylene into its constituents, which comprises treating the said mixture with furfurol.

6. The process for the separation of a mixture of butadiene and butylene into its constituents, which comprises treating the said mixture with ethylene chlorhydrin.

7. The process of separating diolefines from mixtures containing mono-olefines which comprises treating the said mixtures with an organic solvent containing at least one element selected from the group consisting of oxygen, nitrogen and halogen and which, when shaken with a liquid mixture of diolefines and mono-olefines, causes the formation of two separate layers.

8. The process of separating gaseous diolefines from a gaseous mixture containing mono-olefines which comprises treating the gaseous mixture with an organic solvent containing at least one element selected from the group consisting of oxygen, nitrogen and halogen and which, when shaken with a liquid mixture of diolefines and mono-olefines, causes the formation of two separate layers.

9. The process of separating gaseous diolefines from a gaseous mixture containing mono-olefines which comprises treating the gaseous mixture in counter-current with an organic solvent containing at least one element selected from the group consisting of oxygen, nitrogen and halogen and which, when shaken with a liquid mixture of diolefines and mono-olefines, causes the formation of two separate layers.

10. A process for the separation of butadiene from a mixture containing mono-olefines which comprises treating the mixture with an organic solvent containing at least one element selected from the group consisting of oxygen, nitrogen and halogen and which, when shaken with a liquid mixture of diolefines and mono-olefines, causes the formation of two separate layers.

11. A process for the separation of a mixture of butadiene and butylene into its constituents which comprises treating said mixture with an organic solvent containing at least one element selected from the group consisting of oxygen, nitrogen and halogen and which, when shaken with a liquid mixture of diolefines and mono-olefines, causes the formation of two separate layers.

In testimony whereof we have hereunto set our hands.

OTTO SCHMIDT.
OTTO GROSSKINSKY.